United States Patent
Komatsu (10) Patent No.: US 9,762,333 B2
(45) Date of Patent: Sep. 12, 2017

(54) OPTICAL RECEIVER AND OPTICAL RECEPTION METHOD

(71) Applicant: NEC Corporation, Tokyo (JP)

(72) Inventor: Hirokazu Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 36 days.

(21) Appl. No.: 14/910,657

(22) PCT Filed: Aug. 20, 2014

(86) PCT No.: PCT/JP2014/004258
§ 371 (c)(1),
(2) Date: Feb. 5, 2016

(87) PCT Pub. No.: WO2015/025520
PCT Pub. Date: Feb. 26, 2015

(65) Prior Publication Data
US 2016/0182157 A1    Jun. 23, 2016

(30) Foreign Application Priority Data
Aug. 21, 2013 (JP) .................................. 2013-171049

(51) Int. Cl.
H04B 10/67 (2013.01)
H04B 10/69 (2013.01)
H04B 10/079 (2013.01)

(52) U.S. Cl.
CPC ....... *H04B 10/674* (2013.01); *H04B 10/0795* (2013.01)

(58) Field of Classification Search
CPC ............................. H04B 10/674; H04B 10/695
See application file for complete search history.

(56) References Cited

U.S. PATENT DOCUMENTS 7,058,315 B2 * 6/2006 Brewer ................. H04L 25/062
370/286
2004/0062557 A1 * 4/2004 Takashima ........... H04B 10/674
398/209

FOREIGN PATENT DOCUMENTS

JP    S 59-110232 A    6/1984
JP    2003-158493 A    5/2003
(Continued)

OTHER PUBLICATIONS

Japanese Office Action dated Dec. 6, 2016 with a partial English translation thereof.
(Continued)

*Primary Examiner* — Shi K Li
(74) *Attorney, Agent, or Firm* — McGinn IP Law Group, PLLC (57) ABSTRACT

In order to reduce a delay at the time of detecting inputted optical signals in an optical receiver using a variable optical attenuator, the optical receiver includes: a variable optical attenuator that outputs optical signals by attenuating the intensity of inputted optical signals; a photoelectric converter that converts the optical signals into electric signals; an amplitude detection circuit that outputs an output voltage based on the amplitude of the electric signals; an optical attenuator control circuit that outputs signals for controlling an attenuation quantity of the variable optical attenuator based on the output voltage; a signal detection circuit that outputs signal detection output by comparing the output voltage and a signal detection threshold voltage, i.e., reference of signal detection, to each other; and a threshold control circuit, which monitors the output voltage, and which changes the signal detection threshold voltage when an output voltage change state becomes stable with time.

20 Claims, 6 Drawing Sheets

(56) References Cited

FOREIGN PATENT DOCUMENTS

| | | |
|---|---|---|
| JP | 2004-153758 A | 5/2004 |
| JP | 2008-153934 A | 7/2008 |
| JP | 2008-167221 A | 7/2008 |
| JP | 2008-245118 A | 10/2008 |
| WO | WO 2012/066859 A1 | 5/2012 |

OTHER PUBLICATIONS

International Search Report (ISR) (PCT Form PCT/ISA/210), in PCT/JP2014/004258, dated Sep. 30, 2014.
Written Opinion of the International Searching Authority in PCT/JP2014/004258 dated Sep. 30, 2014.

\* cited by examiner

OPTICAL RECEIVER AND OPTICAL RECEPTION METHOD

TECHNICAL FIELD

The present invention relates to an optical receiver and an optical reception method used in optical communications and, in particular, to an optical receiver and an optical reception method, each includes a variable optical attenuator.

BACKGROUND ART

Characteristics required of optical receivers in general include high receiver sensitivity, wide dynamic range and high response speed. In order to achieve wide dynamic range, which is one of the required characteristics, a variable optical attenuator is widely used. PTL (patent literature) 1 describes an example of optical receiver that controls a variable optical attenuator by feedback control.

The optical receiver described in PTL 1 includes the variable optical attenuator on the light input side of an APD (avalanche photodiode). When the level of an output signal from the APD exceeds a given value during reception of a burst optical signal, the attenuation of the variable optical attenuator changes from low to high. When the reception of the burst optical signal ends, the attenuation of the variable optical attenuator changes from high to low. PTL 1 states that such a configuration can achieve a high receiver sensitivity and wide dynamic range and can prevent adverse effects of on burst light reception in which the ratio between the time during which an optical signal is received and the time during which an optical signal is not received is extremely large. PTL 2 and PTL 3 describe optical receivers including variable optical attenuators.

CITATION LIST

Patent Literature

[PTL 1] Japanese Laid-open Patent Publication No. 2008-167221
[PTL 2] International Publication No. WO2012/066859
[PTL 3] Japanese Laid-open Patent Publication No. 59-110232

SUMMARY OF INVENTION

Technical Problem

In the optical receiver described in PTL 1, when the output level of the APD exceeds the given value, the attenuation of the variable optical attenuator changes from low to high. This configuration can prevent saturation of a preamplifier due to a large transient response signal and a large photoelectric current which may be a problem when excessively strong light is input. However, the optical receiver described in PTL 1 cannot avoid a prolonged signal recovery time.

The reason is as follows. Variable optical attenuators widely used change attenuations by temperature control. In general, the response speed of temperature change is slower than the response speed of an electrical circuit. Especially when a signal at a minimum reception level is received after reception of a signal at a maximum reception level, it takes a long time to detect the received signal because the attenuation of the variable optical attenuator needs to be changed significantly. As a result, restoration time at the optical receiver is considerably prolonged. This makes it difficult for an optical receiver that uses a variable optical attenuator to quickly respond to abrupt changes in the input light level at events such as line switching. Another problem is that when feedback control is performed in an optical receiver including a variable optical attenuator, the response speed of the feedback control also decreases due to slow response speed of the variable optical attenuator. Further, neither PTL 2 nor PTL 3 discloses a configuration for avoiding prolonged signal recovery time.

As described above, the limitations of the response performance of variable optical attenuators and feedback control for increasing the accuracy and stability of light attenuation lead to prolonged signal recovery time. It is effective in reducing signal recovery time to reduce signal detection time. This is because a method is commonly used in which detection of a signal triggers control of an optical receiver. In other words, reduction of time required for detecting a signal is essential to increasing response speed.

When feedback control which requires the input of an output result from the variable optical attenuator into the variable optical attenuator is performed by an electrical circuit, the response time of the feedback control is governed by the response time of the variable optical attenuator. This means slow response speed of the electrical circuit, in addition to the prolonged response time of the optical attenuator itself.

Figure 5:
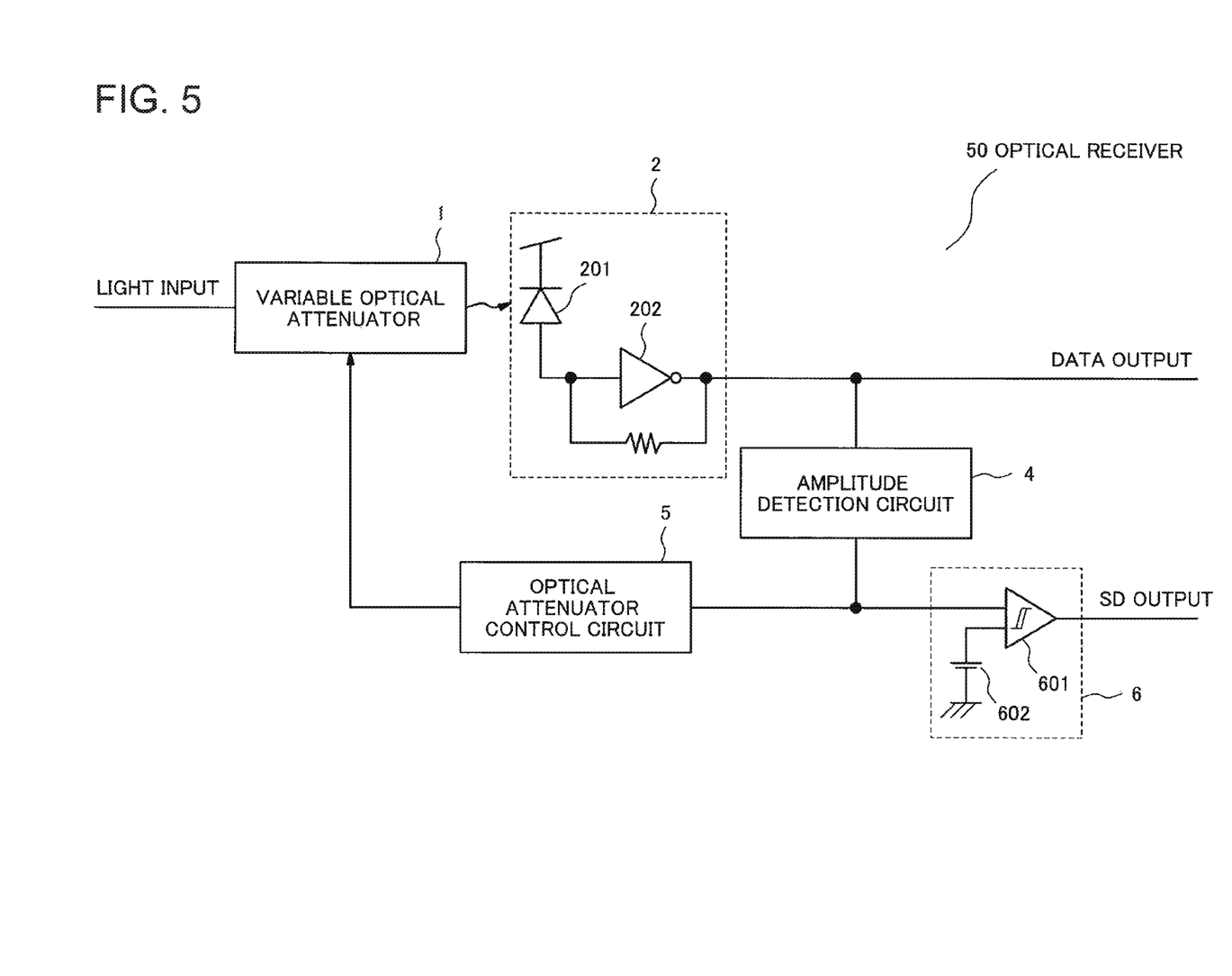
FIG. 5 is a block diagram illustrating a configuration of a related optical receiver.

An optical receiver having a configuration that uses the feedback control will be described in further detail by using the drawings. FIG. 5 illustrates an exemplary configuration of an optical receiver relating to the present invention. The optical receiver 50 illustrated in FIG. 5 includes a variable optical attenuator preceding a converter that converts an optical signal to an electrical signal (Optical-Electrical conversion, hereinafter referred to as "O-E conversion), in order to provide a wide dynamic range. Specifically, a variable optical attenuator 1 is disposed at the input side of the optical receiver 50 and an O-E conversion circuit 2 configured by a photodetector 201 and a transimpedance amplifier 202 is disposed at the output side of the variable optical attenuator 1. An input optical signal is converted to an electrical signal by photoelectric conversion at the O-E conversion circuit 2. The electrical signal output from the O-E conversion circuit 2 is detected by an amplitude detection circuit 4 and an output of the amplitude detection circuit 4 is input into an optical attenuator control circuit 5. An output from the optical attenuator control circuit 5 is input into the variable optical attenuator 1. The output from the amplitude detection circuit 4 is also input into a signal detection circuit 6 configured by a comparator 601 and a reference voltage source 602. The signal detection circuit 6 outputs a signal called an SD (Signal Detection) signal which indicates the detection of an input optical signal ("SD OUTPUT" in FIG. 5).

In this way, a feedback control system is formed in which a variable condition is fed back from the output of the variable optical attenuator 1 through the O-E conversion circuit 2 and the amplitude detection circuit 4 to the variable optical attenuator 1 by the optical attenuator control circuit 5. The response time of the feedback control system is governed by the response time of the variable optical attenuator, which has a slow response. As a result, a delay of an SD signal arises. Next, the delay of the SD signal will be described in detail by using the drawings.

Figure 4:
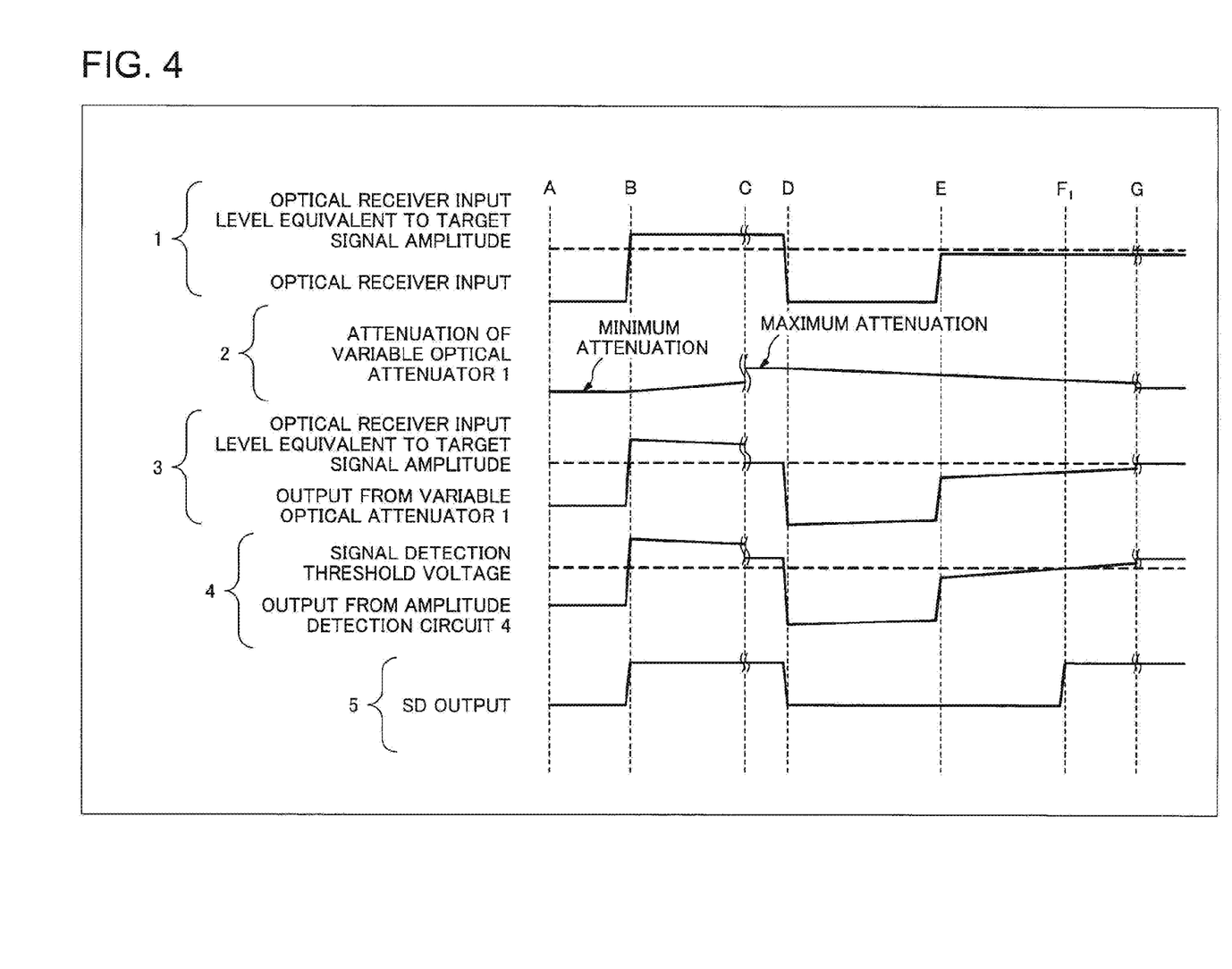
FIG. 4 is a timing chart for illustrating an operation of a related optical receiver.

FIG. 4 is a timing chart for illustrating an operation of the optical receiver 50 described above. In FIG. 4, time flows from left to right and there are steps A to G. In FIG. 4, the input signal level of the optical receiver 50 changes from a no-input state A-B (i.e. a "no-signal" state) to a maximum input signal state B-D and then to a no-input state D-E. After the maximum input signal state B-D, the level of the optical signal input into the optical receiver 50 changes to a level (a low reception level) lower than an input optical signal level equivalent to a target signal amplitude. The rows in the timing chart indicate the following levels in order, starting at the top. The first row indicates an input level of the optical receiver 50 (the solid line) and an input level of the optical receiver 50 that is equivalent to the target signal amplitude of the optical attenuator control circuit 5 (the dashed line). The second row indicates a light attenuation set in the variable optical attenuator 1. The third row indicates the level of an optical signal output from the variable optical attenuator 1 (the solid line) and an input level of the optical receiver 50 that is equivalent to the target signal amplitude of the optical attenuator control circuit 5 (the dashed line). The fourth row indicates an output level of the amplitude detection circuit 4 (the solid line) and a signal detection threshold voltage (the dashed line). The fifth row indicates an output level of the SD signal (SD OUTPUT).

The target signal amplitude is an amplitude preset in the optical attenuator control circuit 5. The optical attenuator control circuit 5 compares the amplitude of a signal output from the amplitude detection circuit 4 with the target signal amplitude. When the amplitude of the signal output from the amplitude detection circuit 4 is greater than the target signal amplitude, the optical attenuator control circuit 5 controls the variable optical attenuator 1 so as to increase the attenuation of the variable optical attenuator 1. When the amplitude of the signal output from the amplitude detection circuit 4 is lower than the target signal amplitude, the optical attenuator control circuit 5 controls the variable optical attenuator 1 so as to decrease the attenuation of the variable optical attenuator 1.

In step A where the signal level represents no-signal state, the attenuation of the variable optical attenuator 1 is set at a minimum attenuation. The SD output at this moment indicates "no signal" (a low level). For simplicity of explanation, it is assumed here that the minimum attenuation of the variable optical attenuator 1 is "no attenuation".

When a signal at the maximum reception level is input in step B, the variable optical attenuator 1 outputs a signal at the same level as the maximum reception level to the O-E conversion circuit 2. The amplitude detection circuit 4 detects a maximum amplitude that is proportional to the maximum reception level. When a signal at the maximum reception level is input, the amplitude detection circuit 4 outputs a signal having an amplitude greater than the target signal amplitude set in the optical attenuator control circuit 5. Accordingly, the optical attenuator control circuit 5 controls the attenuation of the variable optical attenuator 1 to increase the attenuation of the variable optical attenuator 1. On the other hand, a signal at a voltage greater than the voltage of the reference voltage source 602 is input from the amplitude detection circuit 4 into the signal detection circuit 6. As a result, the SD output changes from the "no-signal" state (the low level) to a "signal-detected" state (the high level) without delay. The optical attenuator control circuit 5 controls the variable optical attenuator 1 so as to increase the attenuation. Accordingly, the output level of the variable optical attenuator 1 then gradually decreases. The output from the variable optical attenuator 1 continues decreasing until the output reaches the signal level set as the target signal amplitude in the optical attenuator control circuit 5.

In step C, the attenuation of the variable optical attenuator 1 gradually increases and eventually reaches the maximum attenuation. During this time, a signal at a voltage greater than the voltage of the reference voltage source 602 is input from the amplitude detection circuit 4 into the signal detection circuit 6. Accordingly, the SD output is maintained in the "signal-detected" state.

When the optical input signal is no longer input (the "no-signal" state) in step D, the attenuation of the variable optical attenuator 1 is at the maximum. Accordingly, the amplitude of the signal output from the amplitude detection circuit 4 is much lower than in the absence of the variable optical attenuator. Then the optical attenuator control circuit 5 detects the amplitude, which is much lower than the set target signal amplitude, and starts control to decrease the attenuation of the variable optical attenuator 1. On the other hand, since the amplitude of the signal input from the amplitude detection circuit 4 into the signal detection circuit 6 is also lower than the amplitude of the reference voltage source 602, the SD output changes to the "no-signal" state without delay. Then the level of the output from the variable optical attenuator 1 gradually increases by the control of the optical attenuator control circuit 5 to decrease the attenuation of the variable optical attenuator 1.

Step E indicates the time point a relatively short time after the optical receiver 50 entered the non-input state in step D. The attenuation of the variable optical attenuator 1 is controlled so as to gradually decrease from the maximum attenuation. However, the attenuation of the variable optical attenuator 1 has not reached the minimum attenuation at the time point of step E. When under this condition an optical input signal at a signal level lower than the target signal amplitude set in the optical attenuator control circuit 5 is received, the amplitude output from the amplitude detection circuit 4 is lower than the value of the reference voltage source 602 of the signal detection circuit 6. As a result, the SD output remains in the "no-signal" state (the low level). In other words, when an input optical signal is received in step E, the SD output does not immediately represent the "signal-detected" state. Since the level of the input optical signal in step E is lower than the target signal amplitude set in the optical attenuator control circuit 5, the variable optical attenuator 1 is controlled so as to decrease toward the minimum attenuation and the level of output from the variable optical attenuator 1 gradually increases.

In step F1, the amplitude value detected by the signal detection circuit 6 is greater than the value of the reference voltage source 602 and the SD output represents the "signal-detected" state (the high level). The SD output does not follow the change in the input optical signal that has occurred in step E until step F1. In other words, a delay in signal detection has occurred (between step E and step F1).

In step G, the attenuation of the variable optical attenuator 1 continues to decrease and eventually reaches the "minimum attenuation". As a result, the output from the variable optical attenuator 1 stabilizes and DATA output from the optical receiver 50 in FIG. 5 also stabilizes.

On the other hand, there is a control method that does not feed back outputs from an optical attenuator 1 into an optical receiver (feedforward control). Next, improvement of response speed with a configuration using the feedforward control will be investigated.

Figure 6:
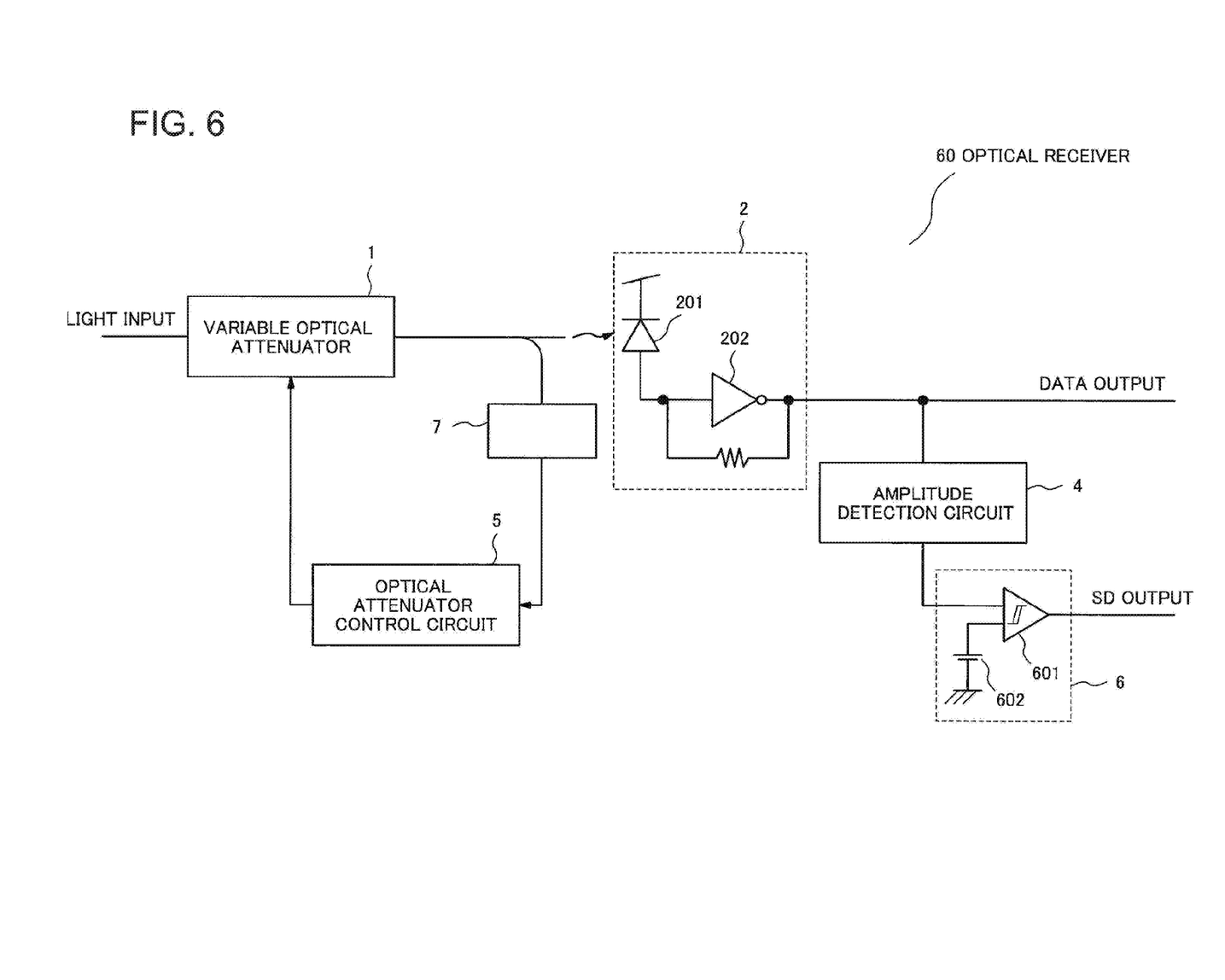
FIG. 6 is a block diagram illustrating a configuration of another related optical receiver.

FIG. 6 is a block diagram illustrating a configuration of another optical receiver relating to the present invention. The optical receiver 60 in FIG. 6 is an example of a configuration that uses feedforward control. In the configuration of the optical receiver 60 in FIG. 6, a tap PD (photodiode) 7 which performs detection of reception level is disposed between a variable optical attenuator 1 and an O-E conversion circuit 2. An input optical signal is converted to an electrical signal at the tap PD 7 and the electrical signal output is input into a gain control terminal of the variable optical attenuator 1 through an optical attenuator control circuit 5. In the configuration in FIG. 6, the attenuation is controlled at the variable optical attenuator in accordance with the level of light reception. When this control method is used in a coherent optical receiver, which is used in wavelength division multiplexing communications, signals of wavelengths different from the wavelength of locally generated light are also received together. Accordingly, an amplitude detection circuit 4 receives not only a signal of a wavelength to be received but also optical signals that are not to be received. In other words, there is a problem with the feedforward control that it is difficult to perform input optical signal power control itself. The configuration that uses feedforward control is therefore not effective in controlling an optical attenuator used in an optical receiver.

As described above, an optical receiver that uses a variable optical attenuator has a problem that it is difficult for the optical receiver to make fast line switching due to a delay in detecting an input optical signal.

An object of the present invention is to provide an optical receiver that solves the problem that it is difficult for an optical receiver that uses a variable optical attenuator to make fast line switching due to a delay in detecting an input optical signal.

Solution to Problem

An optical receiver of the present invention includes:

variable optical attenuation means for attenuating an intensity of an input optical signal and outputting an optical signal attenuated;

optical-electrical (O-E) conversion means for converting the optical signal to an electrical signal;

amplitude detection means for outputting an output voltage based on an amplitude of the electrical signal;

optical attenuator control means for outputting a signal that controls an attenuation of the variable optical attenuation means based on the output voltage;

signal detection means for comparing the output voltage with a signal detection threshold voltage which serves as a criterion for signal detection and providing a signal detection output; and threshold control means for monitoring the output voltage and, when a change of the output voltage in time becomes in a stable state, changes the signal detection threshold voltage.

An optical receiving method of the present invention includes:

attenuating an input optical signal;

converting the attenuated input optical signal to an electrical signal;

acquiring an output voltage based on an amplitude of the electrical signal;

controlling an attenuation of the optical signal based on the output signal;

comparing the output voltage with a signal detection threshold voltage which serves as a criterion for signal detection and generating a signal detection output which is a result of the comparison; and monitoring the generated voltage and, when a change of the output voltage in time becomes in a stable state, changing the signal detection threshold value.

Advantageous Effects of Invention

An optical receiver according to the present invention is capable of reducing a delay in detecting an input optical signal to speed up line switching.

DESCRIPTION OF EMBODIMENTS

Modes for carrying out the present invention will be described below with reference to the drawings. In the following description, same elements are given same reference numerals and repeated description thereof may be omitted.

First Exemplary Embodiment

Figure 1:
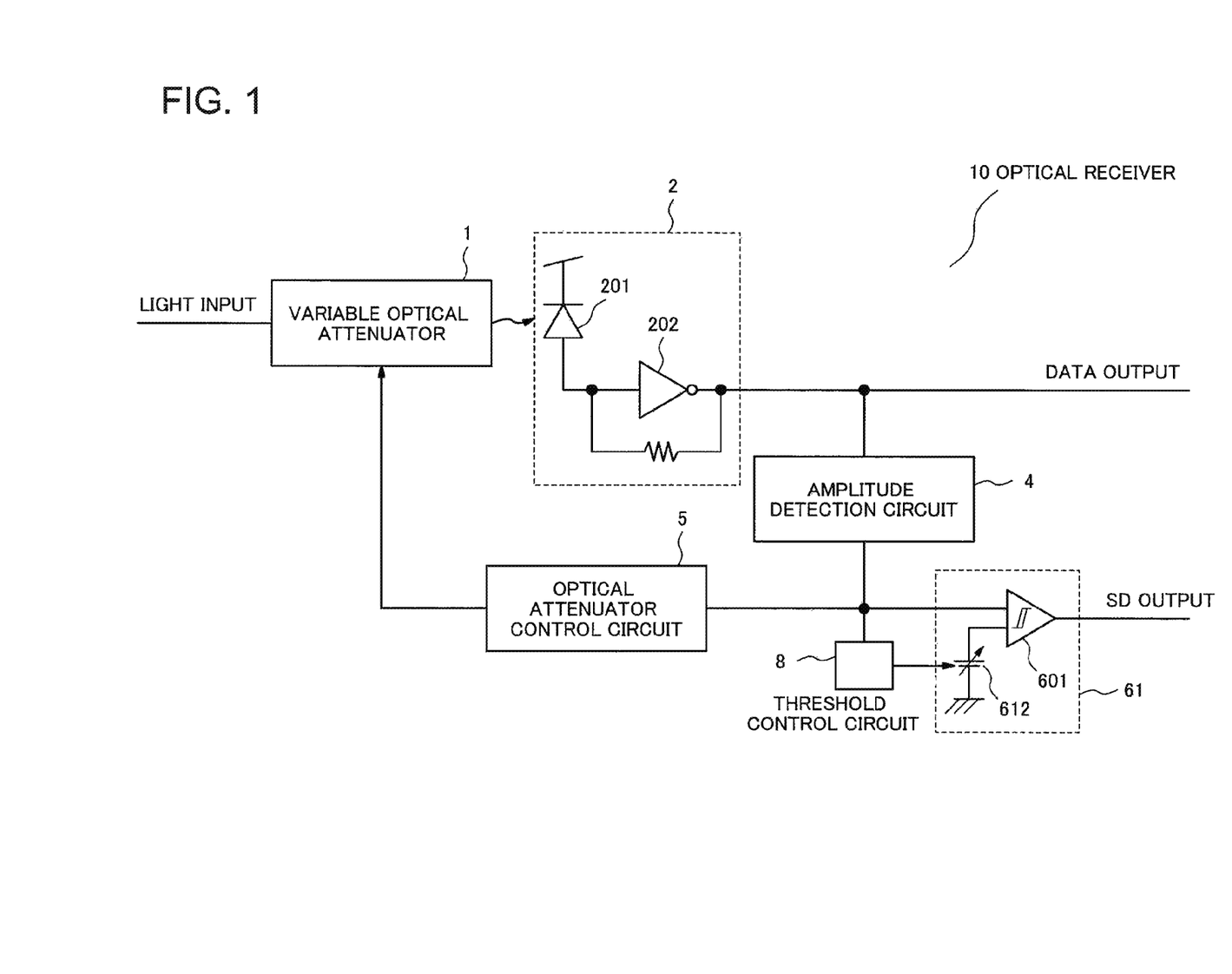
FIG. 1 is a block diagram illustrating a configuration of an optical receiver according to a first exemplary embodiment of the present invention.

FIG. 1 is a block diagram illustrating a configuration of an optical receiver according to a first exemplary embodiment of the present invention. The optical receiver 10 includes at least a variable optical attenuator 1, an O-E converter 2, an amplitude detection circuit 4, an optical attenuator control circuit 5, a signal detection circuit 6, and a threshold control circuit 8.

The variable optical attenuator 1 attenuates the power of an input optical signal in accordance with an attenuation set by the optical attenuator control circuit 5 and outputs the resulting signal to the O-E converter 2.

The O-E converter 2 is configured by a photodetector 201 and a transimpedance amplifier 202, for example. The O-E converter 2 converts an optical signal received from the variable optical attenuator 1 into an electrical current signal at the photodetector 201, converts and amplifies the electrical current signal to a voltage signal at the transimpedance amplifier 202 at a post-stage of the photodetector 201, and outputs the voltage signal as a DATA output. Note that a post-amplifier may be connected to the post-stage of the O-E converter 2 and the post-amplifier may be provided with the function of amplifying an input signal to a voltage amplitude that is identifiable to a signal processing circuit.

The amplitude detection circuit 4 is connected to the post-stage of the O-E converter 2 and outputs a signal at a voltage based on the amplitude of an output signal (DATA output) from the O-E converter 2. The greater the amplitude of the signal output from the O-E converter 2, the greater the voltage of the signal output from the amplitude detection circuit 4.

The optical attenuator control circuit 5 compares the amplitude of a signal output from the amplitude detection circuit 4 with a preset target signal amplitude. When the amplitude of the signal output from the amplitude detection circuit 4 is greater than the target signal amplitude, the optical attenuator control circuit 5 outputs a control signal that increases the attenuation of the variable optical attenuator 1 to the variable optical attenuator 1. On the other hand, when the amplitude of the signal output from the amplitude detection circuit 4 is lower than the target signal amplitude, the optical attenuator control circuit 5 outputs a control signal that decreases the attenuation of the variable optical attenuator 1 to the variable optical attenuator 1.

The signal detection circuit 61 is configured by a compactor 601 and a threshold voltage setting unit 612, for example. An output voltage of the amplitude detection circuit 4 and a voltage (threshold) set in the threshold voltage setting unit 612 are input into the comparator 601. The comparator 601 compares the two input voltages and, when the output voltage of the amplitude detection circuit 4 exceeds the set threshold, provides an SD signal at a high level.

The threshold control circuit 8 monitors an output from the amplitude detection circuit 4. For example, the threshold control circuit 8 monitors changes in the output voltage from the amplitude detection circuit 4 periodically. When changes in the output voltage with time are not found, the threshold control circuit 8 determines that the output voltage from the amplitude detection circuit 4 is in a stable state. When it is determined that the output from the amplitude detection circuit 4 has stabilized, i.e. when it is determined that the attenuation of the variable optical attenuator 1 has stabilized, the threshold control circuit 8 controls the threshold voltage setting unit 612 to change the threshold for the comparator 601.

Note that in the control for changing the threshold, the threshold is decreased when the attenuation effect of the variable optical attenuator 1 is to be intensified. The degree of decrease of the threshold is determined in accordance with the attenuation. Specifically, the threshold control circuit 8 sets, based on the attenuation of the variable optical attenuator 1, a range within which the signal detection threshold voltage is changed. In this way, the threshold value control circuit 8 controls the threshold voltage setting unit 612 as needed, in accordance with the output amplitude from the amplitude detection circuit 4. Next, an operation of the optical receiver 10 will be described in detail by using FIG. 2.

Figure 2:
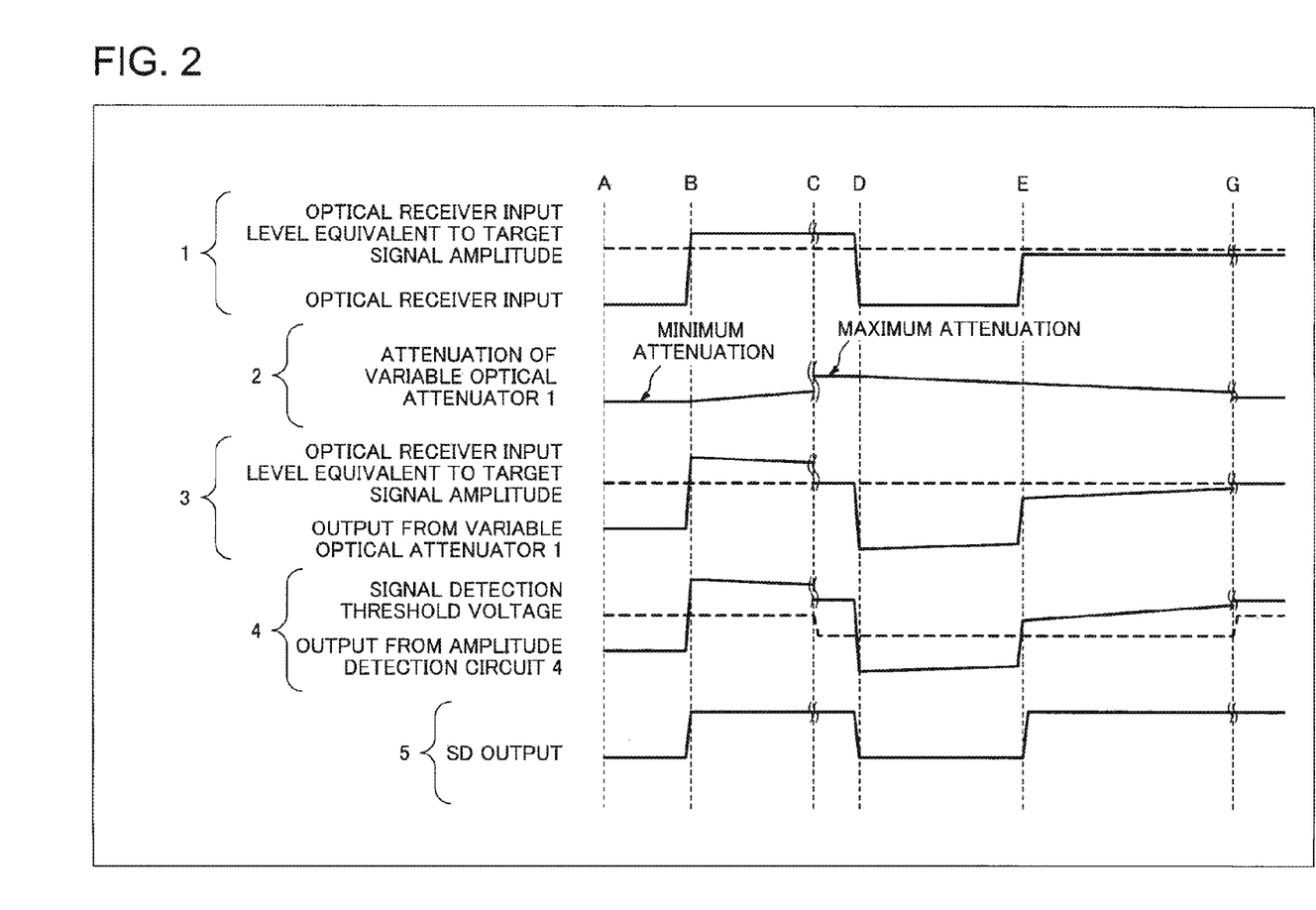
FIG. 2 is a timing chart for illustrating an operation of the optical receiver according to the first exemplary embodiment of the present invention.

FIG. 2 is a timing chart for illustrating an operation according to the first exemplary embodiment of the present invention. In FIG. 2, time flows from the left to the right and there are steps A to G. In FIG. 2, the level of a signal input into the optical receiver 10 changes from a no-input state A-B (i.e. a "no-signal" state) to a maximum input signal state B-D and then to a no-input state D-E. After the no-input state D-E, the level of the optical signal input into the optical receiver 10 changes to a level lower than an input optical signal level (a low reception level) E-G that is equivalent to a target signal amplitude. The rows in the timing chart indicate the following levels in order, starting at the top. The first row indicates an input level of the optical receiver (the solid line) and an input level in the optical receiver 10 (the dashed line) that is equivalent to a target signal amplitude which the optical attenuator control circuit 5 sets as the control target. The second row indicates a light attenuation of the variable optical attenuator 1. The third row indicates an optical level output from the variable optical attenuator 1 (the solid line) and an input level in the optical receiver 10 that is equivalent to the target signal amplitude of the optical attenuator control circuit 5 (dashed line). The fourth row indicates an output level of the amplitude detection circuit 4 (the solid line) and a signal detection threshold voltage set by the threshold voltage setting unit 612 (the dashed line). The fifth row indicates an output level (SD OUTPUT) of the SD signal. The timing chart illustrated in FIG. 4 differs from the timing chart illustrated in FIG. 2 in step C and subsequent steps. Differences between FIGS. 2 and 4 will be described below.

The threshold control circuit 8 detects an output voltage from the amplitude detection circuit 4 at regular intervals. When variations in the output voltage from the amplitude detection circuit 4 decreases in step C or later, the threshold control circuit 8 determines that the output voltage from the amplitude detection circuit 4 has stabilized and controls the threshold voltage setting unit 612 to decrease the signal detection threshold voltage set by the threshold voltage setting unit 612 to a minimum value. In other words, when the value of the voltage output from the amplitude detection circuit 4 has decreased and then stabilized, the threshold control circuit 8 changes the signal detection threshold voltage to decrease. Note that the threshold control circuit 8 may determine that the output voltage from the amplitude detection circuit 4 has stabilized when variations in the output voltage from the amplitude detection circuit 4 is within a given range over a given period of time.

In step D, no optical signal is input (the "no-signal" state). Because the attenuation of the variable optical attenuator 1 is at the maximum in step D, the output level of the amplitude detection circuit 4 is much lower than in the absence of the variable optical attenuator 1. Accordingly, the optical attenuator control circuit 5 starts control to decrease the attenuation of the variable optical attenuator 1. Because the output amplitude from the amplitude detection circuit 4 in the signal detection circuit 61 is also lower than the signal detection threshold voltage, the SD output changes to a no-signal state (the SD signal goes "low") without delay. Note that the minimum value of the signal detection threshold is set such that the minimum value is not smaller than the signal amplitude in the no-signal state. The optical attenuator control circuit 5 continues to control the variable optical attenuator 1 so as to decrease the amplitude. As a result, the output levels of the variable optical attenuator 1 and the amplitude detection circuit 4 gradually increase.

In step E, the input into the optical receiver 10 changes from the no-input state to the light-input state. It is assumed here that the amplitude of the input optical signal in step E is lower than the target signal amplitude. The attenuation of the variable optical attenuator 1 here is smaller than the maximum attenuation but has not reached the minimum attenuation. Accordingly, the output from the amplitude detection circuit 4 is reduced so that the amplitude of the output is smaller than the initial signal detection threshold voltage (the signal detection threshold voltage in period A-B). In step C, however, the signal detection threshold voltage has decreased to a minimum threshold that depends on an attenuation control amount. Accordingly, the SD output can change to a "signal detected" state without delay when the optical receiver 10 receives an optical signal. Because the amplitude of the input optical signal remains smaller than the target signal amplitude, the optical attenuator control circuit 5 controls the variable optical attenuator 1 to decrease the attenuation of the variable optical attenuator 1. As a result, the output level of the variable optical attenuator 1 gradually increases. The attenuation of the variable optical attenuator 1 continues to decrease and eventually reaches a minimum attenuation (no attenuation). The threshold control circuit 8 monitors the output voltage of the amplitude detection circuit 4 periodically and, when variations in the output voltage are no longer found, determines that the output voltage is in a stable state.

When the voltage of the signal output from the amplitude detection circuit 4 has been found to be equal a given number of times or more in step G, the threshold control circuit 8 determines that the output voltage has been stabilized and performs control to increase the threshold. Specifically, the threshold control circuit 8 controls the threshold voltage setting unit 612 to return the signal detection threshold voltage to the initial, no-attenuation state (in period A-B). In other words, when a value of the output voltage from the amplitude detection circuit 4 has stabilized after a rise in the output voltage, the threshold control circuit 8 changes the control to increase the signal detection threshold. When the threshold voltage reaches a value similar to the value in the period between steps A and B immediately after step G, the output voltage from the amplitude detection circuit 4 is still greater than the signal detection threshold voltage. Accordingly, the SD signal is maintained high and the signal in the signal detected state continues to be output.

As described above, even when the variable optical attenuator slowly changes from a state in which the variable optical attenuator is controlled to a maximum attenuation to a state in which the variable optical attenuator is controlled to a minimum attenuation (no attenuation) according to the present invention, an input optical signal can be detected without delay after a no-input state. In other words, the optical receiver 10 according to the first exemplary embodiment has the advantageous effect of being able to speed up the signal detection and avoiding a prolonged signal recovery time at line switching. In addition, the optical receiver 10 according to the first exemplary embodiment does not need to include a plurality of amplitude detection circuits having different thresholds because the optical receiver 10 dynamically controls the signal detection threshold of the amplitude detection circuit. Accordingly, the optical receiver 10 according to the first exemplary embodiment has the advantageous effect of avoiding increase of the circuit size to achieve a reduced size.

Second Exemplary Embodiment

Figure 3:
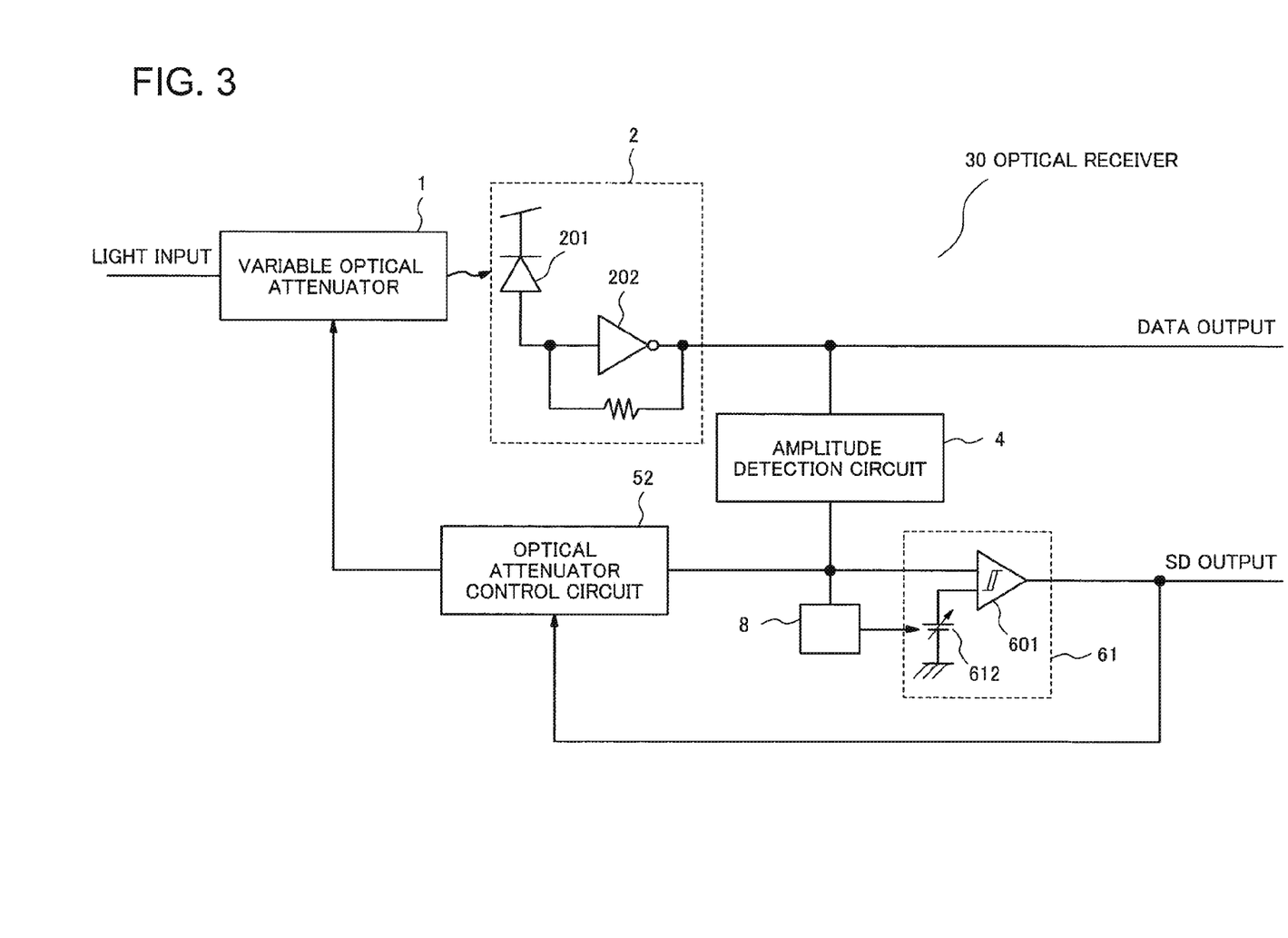
FIG. 3 is a block diagram illustrating a configuration of an optical receiver according to a second exemplary embodiment of the present invention.

FIG. 3 is a block diagram illustrating a configuration of an optical receiver 30 according to a second exemplary embodiment of the present invention. The configuration in the block diagram in FIG. 3 differs from the configuration in the block diagram in FIG. 1 in that the configuration in FIG. 3 includes an optical attenuator control circuit 52 that has an initialization function and an arrangement that feeds back an SD output to the optical attenuator control circuit 52. Other components in the block diagram in FIG. 3 are the same as those in the block diagram in FIG. 1.

(Configuration)

The optical attenuator control circuit 52 compares a signal amplitude detected at an amplitude detection circuit 4 with a preset target signal amplitude and, when the signal amplitude is greater than the target signal amplitude, outputs a control signal that increases the attenuation of a variable optical attenuator 1. Further, the optical attenuator control circuit 52 has the function of detecting an SD output provided from a signal detection circuit 61 and initializing the attenuation of the variable optical attenuator 1.

(Operation)

First, in the timing chart (FIG. 2) of the first exemplary embodiment, when an input optical signal changes from a maximum input level to a no-input state to an input level lower than the target attenuation, the SD output follows the change without delay. In other words, the SD output changes from a signal-detected state to a no-signal-detected state to a signal-detected state. The response speed of the amplitude detection circuit 4 is governed by the response speed of the variable optical attenuator 1 and is nearly equal to the response speed of the variable optical attenuator 1. In other words, the amplitude detection circuit 4 has a slow time constant. Similarly, the optical attenuator control circuit 5, which operates in response to an output from the amplitude detection circuit 4, operates with the slow time constant. In this way, the optical attenuator control circuit 5 according to the first exemplary embodiment compares an output from the amplitude detection circuit 4 with the target signal amplitude and outputs a signal that controls the attenuation of the variable optical attenuator 1 with a slow time constant.

On the other hand, the optical attenuator control circuit 52 according to the second exemplary embodiment sets a given attenuation for the variable optical attenuator 1 in accordance with an SD output as the SD output changes with changes in an input optical signal. For example, when a loss of input optical signal has occurred, i.e. when the SD output has changed to a state indicating a no-signal state, the optical attenuator control circuit 52 can forcedly set the attenuation of the variable optical attenuator 1 to a given value. In other words, the optical attenuator control circuit 52 also includes the function of initializing the attenuation. The attenuation of the variable optical attenuator 1 set after the initialization may be a value intermediate between the maximum attenuation and the minimum attenuation, for example. Because of the initialization function, the optical receiver 30 further has the effect of speeding up the setting of a control signal for the variable optical attenuator.

While the present invention has been described with reference to exemplary embodiments, the present invention is not limited to the exemplary embodiments described above. Various alterations apparent to those skilled in the art can be made to configurations and details of the present invention within the scope of the present invention. For example, the threshold control circuit 8 may be included in the optical attenuator control circuit 5 or the optical attenuator control circuit 52 with initialization function.

This application claims priority based on Japanese Patent Application 2013-171049, filed on Aug. 21, 2013, the disclosure of which is hereby incorporated by reference in its entirety.

REFERENCE SIGNS LIST

1 Variable optical attenuator
2 O-E converter
201 Photodetector
202 Transimpedance amplifier
4 Amplitude detection circuit
5, 52 Optical attenuator control circuit
6, 61 Signal detection circuit
601 Comparator
602 Reference voltage source
612 Threshold voltage setting unit
7 Tap PD
8 Threshold control circuit
10, 30, 50, 60 Optical receiver

The invention claimed is:

1. An optical receiver comprising:
   a variable optical attenuator that attenuates an intensity of an input optical signal and outputting an optical signal attenuated;
   an optical-electrical (O-E) converter that converts the optical signal to an electrical signal;
   an amplitude detector that outputs an output voltage based on an amplitude of the electrical signal;
   an optical attenuator controller that outputs a signal that controls an attenuation of the variable optical attenuator based on the output voltage;
   a signal detector that compares the output voltage with a signal detection threshold voltage which serves as a criterion for signal detection and provides a signal detection output; and
   a threshold controller that monitors the output voltage and, when a change, of the output voltage in time becomes in a stable state, changes the signal detection threshold voltage.

2. The optical receiver according to claim 1, wherein when a value of the output voltage is the same over a given period of time, the threshold controller determines that the output from the amplitude detector is stable.

3. The optical receiver according to claim 2, wherein the threshold controller makes a change to decrease the signal detection threshold voltage when the value of the output voltage stabilizes after a drop in the output voltage.

4. The optical receiver according to claim 2, wherein the threshold controller makes a change to increase the signal detection threshold voltage when the value of the output voltage stabilizes after a rise in the output voltage.

5. The optical receiver according to claim 2, wherein the threshold controller sets, based on the attenuation, a range within which the signal detection threshold voltage is changed.

6. The optical receiver according to claim 2, wherein the signal detector comprises:
   a threshold voltage setting unit that sets a signal detection threshold voltage based on a control signal from the threshold controller; and
   a comparator which compares the output voltage with the signal detection threshold voltage and outputs a comparison result as a signal detection output.

7. The optical receiver according to claim 2, wherein the optical attenuator controller further comprises a function of setting the attenuation to a given value based on the signal detection output.

8. The optical receiver according to claim 7, wherein the optical attenuator controller uses the signal detection output that is output when the output voltage is lower than the signal detection threshold voltage to set the given value.

9. The optical receiver according to claim 8, wherein the given value is smaller than a maximum attenuation and greater than a minimum attenuation.

10. The optical receiver according to claim 7, wherein the given value is smaller than a maximum attenuation and greater than a minimum attenuation.

11. The optical receiver according to claim 1, wherein the threshold controller makes a change to decrease the signal detection threshold voltage when the value of the output voltage stabilizes after a drop in the output voltage.

12. The optical receiver according to claim 11, wherein the threshold controller sets, based on the attenuation, a range within which the signal detection threshold voltage is changed.

13. The optical receiver according to claim 1, wherein the threshold controller makes a change to increase the signal detection threshold voltage when the value of the output voltage stabilizes after a rise in the output voltage.

14. The optical receiver according to claim 1, wherein the threshold controller sets, based on the attenuation, a range within which the signal detection threshold voltage is changed.

15. The optical receiver according to claim 1, wherein the signal detector comprises:
    a threshold voltage setting unit that sets a signal detection threshold voltage based on a control signal from the threshold controller; and
    a comparator which compares the output voltage with the signal detection threshold voltage and outputs a comparison result as a signal detection output.

16. The optical receiver according to claim 1, wherein the optical attenuator controller further comprises a function of setting the attenuation to a given value based on the signal detection output.

17. The optical receiver according to claim 16, wherein the optical attenuator controller uses the signal detection output that is output when the output voltage is lower than the signal detection threshold voltage to set the given value.

18. The optical receiver according to claim 16, wherein the given value is smaller than a maximum attenuation and greater than a minimum attenuation.

19. An optical receiving method comprising:
    attenuating an input optical signal;
    converting the attenuated input optical signal to an electrical signal;
    acquiring an output voltage based on an amplitude of the electrical signal;
    controlling an attenuation of the optical signal based on the output signal;
    comparing the output voltage with a signal detection threshold voltage which serves as a criterion for signal detection and generating a signal detection output which is a result of the comparison; and
    monitoring the generated voltage and, when a change of the output voltage in time becomes in a stable state, changing the signal detection threshold value.

20. An optical receiver comprising:
    variable optical attenuation means for attenuating an intensity of an input optical signal and outputting an optical signal attenuated;
    optical-electrical (O-E) conversion means for converting the optical signal to an electrical signal;
    amplitude detection means for outputting an output voltage based an amplitude of the electrical signal;
    optical attenuator control means for outputting a signal that controls an attenuation of the variable optical attenuation means based on the output voltage;
    signal detection means for comparing the output voltage with a signal detection threshold voltage which serves as a criterion for signal detection and providing a signal detection output; and
    threshold control means for monitoring the output voltage and, when a change of the output voltage in time becomes in a stable state, changes the signal detection threshold voltage.

* * * * *